United States Patent [19]

Kunze et al.

[11] Patent Number: 4,865,893
[45] Date of Patent: Sep. 12, 1989

[54] LONGITUDINALLY DIVIDED SLEEVE TUBE FOR CABLE SLEEVES

[75] Inventors: Dieter Kunze, Neuried; Ernst Bachel, Geltendorf, both of Fed. Rep. of Germany

[73] Assignee: Siemens Aktiengesellschaft, Berlin and Munich, Fed. Rep. of Germany

[21] Appl. No.: 130,619

[22] Filed: Dec. 9, 1987

[30] Foreign Application Priority Data

Dec. 18, 1986 [DE] Fed. Rep. of Germany ....... 3643370

[51] Int. Cl.⁴ .......................... F16L 9/00; H02G 15/18
[52] U.S. Cl. .................................. 428/36.9; 138/128; 138/156; 138/166; 138/167; 174/92; 428/188
[58] Field of Search ................ 428/36, 188, 36.9; 138/128, 156, 166, 167; 174/92

[56] References Cited

U.S. PATENT DOCUMENTS

| | | | |
|---|---|---|---|
| 4,364,419 | 12/1982 | Nolf | 138/167 |
| 4,388,488 | 6/1983 | Wicek et al. | 138/166 |
| 4,626,458 | 12/1986 | Dithouse et al. | 428/36 |
| 4,675,512 | 6/1987 | Doucet et al. | 174/92 |

FOREIGN PATENT DOCUMENTS 7423507 11/1974 Fed. Rep. of Germany .

Primary Examiner—Ellis P. Robinson
Assistant Examiner—James J. Seidleck
Attorney, Agent, or Firm—Hill, Van Santen, Steadman & Simpson

[57] ABSTRACT

A sleeve tube which has a single, longitudinal division or opening and is movable from a spread condition to a closed condition to form a circle of a first radius and coact with end sealing elements to form a cable sleeve. In the spread condition, the sleeve has a continually changing curvature, with the radius of curvature of the sleeve at a point opposite the opening being on a maximum radius of curvature and the radius of curvature continuing decrease as the openings are approached so that when the sleeve is moved to the closed position, all portions of the sleeve are deformed a slight amount from the relaxed, opened position to the closed position. Thus, a uniform closing pressure can be obtained on the entire periphery of each of the end sealing members.

15 Claims, 3 Drawing Sheets

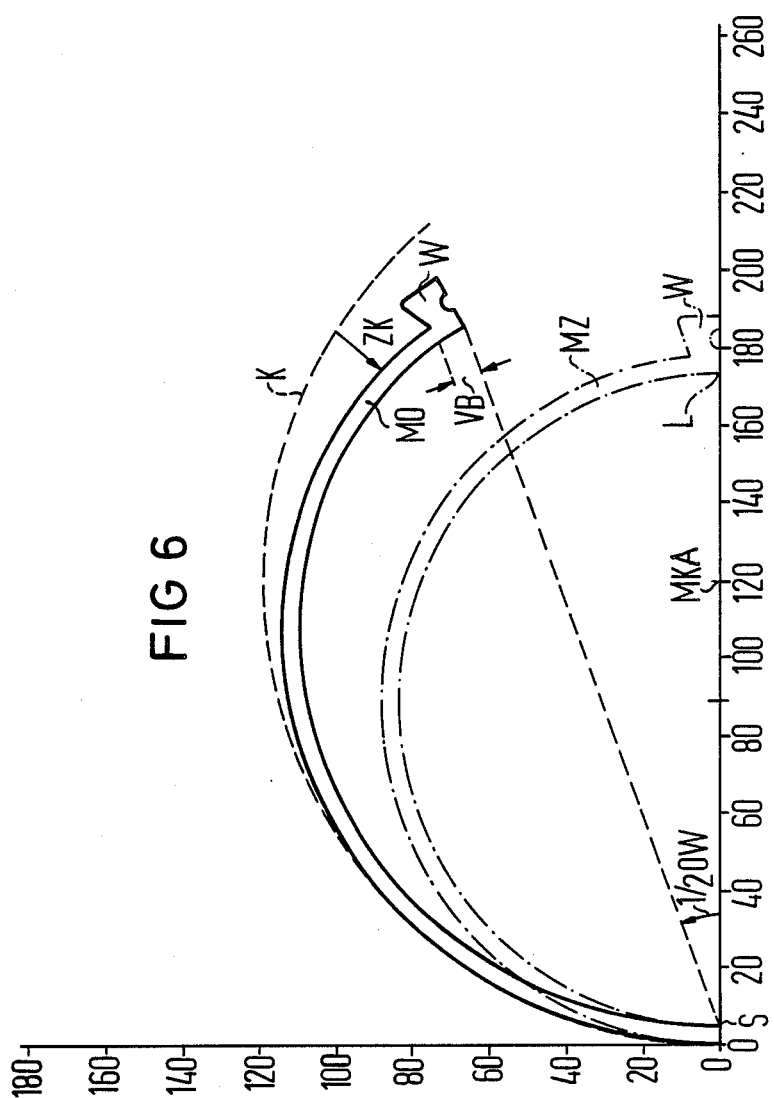

LONGITUDINALLY DIVIDED SLEEVE TUBE FOR CABLE SLEEVES

BACKGROUND OF THE INVENTION

The present invention is directed to a longitudinally divided, spreadable sleeve tube which coacts with sealing elements at each end to form a cable sleeve. The sleeve tube has a longitudinally extending slit or opening having closing elements in the form of a projection, which run along the longitudinal edges of the opening which projection receives a sealing system which is disposed between mating faces of the projections as the projections are clamped together.

Longitudinally divided sleeve tubes, such as disclosed in German Utility Model 74 23 507, have been made opened or in a spreaded condition as required for fitment and for the production operation itself by an injection molding with a cylindrical injection mold. However, this produces various problems with the fitment of the sleeve tube and, in particular, in the sealing area along the dividing line between the mating faces of the projections along the edges of the opening. When fitting the sleeve tube, the two mating faces are always tilted when the sleeve tube is fitted over a circular sealing element. This comes about in that initially only the inner longitudinal edges of the faces touch when they come together so that a wedge-shaped cavity opening towards the outside is formed along the mating faces of the projections forming the dividing line. The mating faces can only be forced into complete contact with the aid of a sturdy closing rail and by applying considerable force which will effect the design of the closing parts. However, this still leaves a critical area between the sleeve tube and the sealing element in the area of the dividing line as the transition of the longitudinal faces is not perfectly continuous. An uneven fitment also produces different loadings in the peripheral area of the seal between the sealing elements at the ends and the tube, which different loadings cause sealing difficulties. This can lead to the sealing means wandering or being appreciably deformed in certain circumstances, depending on the sealing material being used.

SUMMARY OF THE INVENTION

The object of the present invention is to provide a sleeve tube with a single slit made of a thermoplastic synthetic material in which its basic shape in the spread state is such so that it rests on the end sealing elements with the same sealing condition all around and improves the sealing condition in the longitudinal seal when in the closed state.

These objects are achieved in accordance with the present invention by improvements in a longitudinally divided sleeve tube which coacts with end sealing elements to form a cable sleeve, said sleeve tube having a longitudinally extending slot or opening with longitudinally extending projections extending along the slot to form mating faces for forming a sealing system. The improvements are that, while in the spread condition, the opening angle between the longitudinal edges of the opening or slot is such that the mating faces of the two projections will come together face-to-face with uniform contact pressure when moved to a closed state.

A first advantage of the sleeve tube in accordance with the inventions is that the peripheral seal between the fitted sleeve tube and each end sealing element is loaded evenly so that the sealing conditions are the same over the entire peripheral area. A second advantage is the shape of the sleeve tube in a spread condition is such that the mating faces along the longitudinal edges come together in a flat contact when it is fitted onto the sealing element so that the required closing forces are much less than with systems presently known because the force needed to tilt the sealing or mating faces has been eliminated. The cross section of the sleeve tube is so shaped that the sealing faces line up with one another when the sleeve tube is closed so that a clearly defined condition prevails when mutual contact occurs. Thus, reciprocal tilting or movement which would lead to irregularities in the sealing area are no longer possible. These uniform sealing conditions also allow the use of soft sealing inserts made of an elastomer, for example rubber. If the seal is loaded unevenly, for example, only part of the seal might be compressed and the other part barely loaded, and trouble, such as leaks, will occur. Another result of this is that the sealing area and, thus, the sealing means can be made lighter and less expensive due to the reduction in the forces required to form the seal. It is even possible to produce the closing rails of a plastic material, or if necessary of a plastic material which has fiber reinforced so that the improved device allows prevention of corrosion when compared to the metal rails previously used.

Other features and advantages of the present invention will be readily apparent from the following description of the drawings, the preferred embodiments and claims.

BRIEF DESCRIPTION OF THE DRAWINGS

FIG. 6 is a graph illustrating half of the sleeve tube of the present invention with respect to the diameters in various positions.

DESCRIPTION OF THE PREFERRED EMBODIMENTS

The principles of the present invention are particularly useful when incorporated in a sleeve tube M with a single, longitudinal division, slot or opening. The sleeve tube cooperates with end sealing elements DK to form a cable sleeve. As illustrated, a sealing insert D is interposed between the peripheral surface of the sealing elements DK and the sleeve tube M to form a seal when the pressure is applied to the sleeve tube. As illustrated, the sleeve tube M adjacent the longitudinally extending slot has two projections W which have undercuts and a wedge shape. To form a seal, a sealing insert is also located in the longitudinal dividing line in a sealing groove, such as DN (FIG. 2), between the two projections W. A corresponding closure pressure is produced by two matched closing rails VS (FIG. 1) which engage the wedge-shaped projections W to hold the faces in tight sealing engagement. The internal circumference of the sleeve tube M and the external circumference of the sealing element DK at each end are so matched that the required closing pressure is produced in the peripheral sealing system by the fitting of the closing rails VS. In the case of a circular sleeve tube, which is the norm to date, uniform pressure distributions in the peripheral sealing system is not attainable. However, in the present invention, they are.

Figure 2:
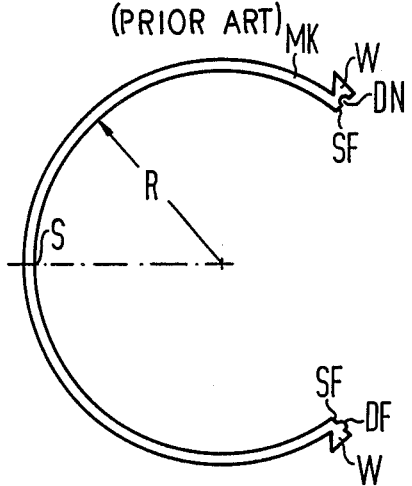
FIG. 2 is an end view of a sleeve tube in a spread condition having a circular configuration in accordance with known sleeve tubes.

As best illustrated in FIG. 2, a prior known sleeve tube MK was made on a cylindrical mold element having a radius R by an injection molding process. Since the sleeve tube has to be opened a certain amount for removal from the mold core during manufacturing and for fitting on elements to be sheathed in order to avoid unnecessarily overstretching it, the longitudinal edges with the longitudinal projections W stand apart from one another on an arc of a circle having the radius R which continues the circular shape of the sleeve tube MK. The mating surfaces or faces SF of the two projections W extend perpendicular to the tangent of being sleeve tube MK in a spread condition. A gap, i.e., the opening of the sleeve tube MK must be maintained in every case as the two mating faces SF must be profiled according to the longitudinal sealing system with the sealing groove, such as DN, and a sealing tongue, such as DF. However, this can only be done when the mating surfaces SF stand apart from one another. The sealing tube MK itself must always exhibit sufficient elasticity to expand further and close later without being damaged. Expediently, a thermoplastic synthetic material is chosen for the tube. For example, a polyolefin which exhibits the appropriate mechanical properties.

Figure 1:
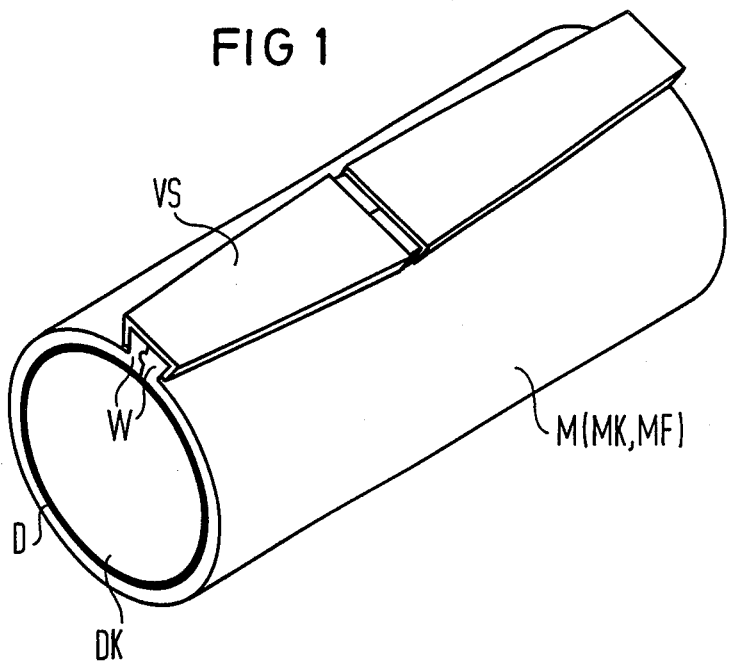
FIG. 1 is a perspective view of a closed cable sleeve comprising the sleeve tube of the present invention, end sealing elements and wedge-shaped closures.
Figure 3:
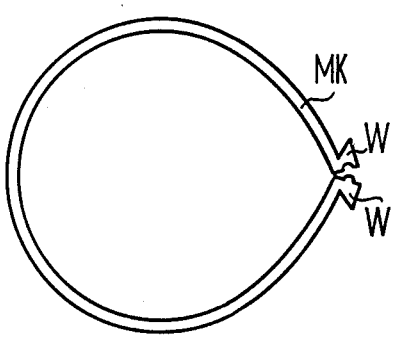
FIG. 3 is the sleeve tube of FIG. 2 when initially moved to a closed position.

As best illustrated in FIG. 3, the prior art sleeve tube MK of FIG. 2 has been moved to a closed position, such as illustrated in FIG. 1. When the two longitudinal edges with the projections W are drawn together, they produce, a tube with a roughly oval shape, and when the longitudinal edges meet, a point is initially formed at the dividing location. This shows that no uniform pressure distribution can be obtained in the sealing system when the sleeve tube MK is fitted. Here, the wedge-shaped areas along the dividing line, when the closing pressure is initially very small, is particularly critical. The two meeting faces SF can only be brought together face-to-face by applying considerable force on the projections W, which inevitably produce a drop in pressure from the inside to the outside. It is these very difficulties mentioned here that the sleeve tube in accordance with the present invention is designed to eliminate, as will be explained hereinafter.

Figure 4:
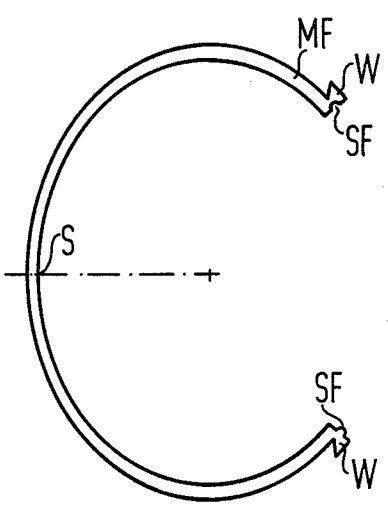
FIG. 4 is an end view of a sleeve tube in accordance with the present invention while in an open condition and which departs from a circular shape.

A sleeve tube MF in accordance with the present invention is illustrated in FIG. 4 and is manufactured on a mold core which no longer has a circular cross section. This mold core and the sleeve tube MF manufactured on it have a form which departs from the circular shape, particularly towards the two longitudinal edges, and these two longitudinal edges are additionally curved inwards. This additional curvature is uniform along the length of the sleeve tube and increases continually. This produces what roughly approximates an egg-shaped cross section, and the additional curvature producing an angular movement of the egg shape. Thus, the sleeve tube cross section is only symmetrical to the center line which runs through the center of the sleeve opening and through an apex S, which is neutral during deformation and lies opposite the opening. This gives the two end faces an additional inward turn with the result that when the longitudinal edges are brought together, the two mating surfaces SF immediately line up face-to-face in the final state. This means that it is only necessary to apply the closing pressure required for the sealing system. However, since, in accordance with the invention, this additional curvature does not just take place at the end edges, but increases uniformly over the entire curvature of the sleeve when the longitudinal edges are brought together, every section of the sleeve tube viewed in part is just moved inward according to the position of the longitudinal edges at the time. Thus, when this inward movement is continued at the ends, every point of the sleeve tube is moved inward evenly until the sleeve tube MF finally bears uniformly on the internal end sealing elements DK. The diameter of the sleeve tube MF and the sealing elements DK can be selected appropriately so that the closing operation, with the aid of the closing rails, produces a required closing pressure in the peripheral sealing system as well.

Figure 5:
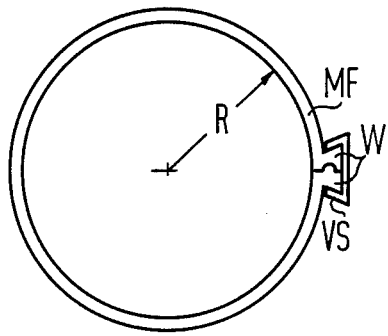
FIG. 5 is the sleeve tube of FIG. 4 when in a closed position and having a circular shape.

FIG. 5 shows the final state of the fitted sleeve tube MF of the present invention with the mating faces being automatically brought together face-to-face and having a uniform contact on a circular sealing element DK. This is produced by the choice of the dimension for the curved shape. The closure rail VS is fitted over the two undercut projections W forming a frictional connection and provide a necessary closing force. As the forces previously required to constrain and align the sleeve tube with its mating faces standing at an oblique angle are no longer needed, the closing elements can be made correspondingly lighter by virtue of the reduced force that is required. In some circumstances, this means that the metal rails previously required can now be replaced with plastic rails which present advantages with regard to corrosion resistance in addition to being easier to manufacture.

Using knowledge in accordance with the present invention, a half sleeve tube in a spread condition is indicated at MO in FIG. 6. It is clear from the illustration that the half-sleeve or tube MO has a different curvature than a curvature of a cylindrical shape K, which has a center point MFA and a first radius, with the difference in curvature being an increase in curvature ZK. The greater the horizontal coordinate becomes, the more the desired sleeve tube shape departs from the circular shape K in an inward direction. One half of an aperture angle $\frac{1}{2}$OW is also indicated in the drawing. Here, this one half of the aperture angle of half the sleeve tube is relative to the central axis of the sleeve tube. The aperture angle should be sufficiently large so that the manufactured sleeve tube can be pulled off the injection mold core after injection molding without any permanent deformation occuring. Also, the aperture angle should be such that it can be fitted over the elements to be sheathed with only slight expansion. Preferably, the one half of the aperture angle $\frac{1}{2}$OW, which extends through the neutral vertex S should be in a range of 30°–50°, which means that the complete aperture angle OW will be in a range of 60°–100°.

When the two longitudinal edges with the projections W have been drawn together, the result is a matched circular shape MZ, which has a second radius and has exactly the diameter corresponding to the sealing elements DK which are to be used. In the undeformed projection area VB on either side of the dividing line L, the final or second radius is determined during the injection molding of the sleeve tube so that the seamless smooth transition is obtained from one longitudinal edge to the other. The graph also shows that the diameter of the fitted sleeve MZ is smaller than that of the imaginary circle K, which approximately coincides with the initial shape of the curvature of the sleeve MF produced with the additional curvature in the spread form or opened condition.

Finally, the function, which underlies the shape of the desired sleeve tube curvature, remains to be explained. This can be assumed to be a function which determines the deflection of an optional curved rod. However, this function only applies to small areas so that integrals must be formed over the entire length of the arrangement. However, such a curve can best be determined with relative ease by the iterative method using modern electronic calculating means so that the desired curve shape can be defined very precisely when the limiting conditions have been entered.

According to Castigliano's theorem, the deflection f, which, for our purposes, is the curvature ZK of a bar in the direction of a load P, is equal to the partial derivative of the deformation energy A with respect to the load P. In our application, the load P should be equated with the force with which the longitudinal edges are pressed inward. When E is the modulus of elasticity, I the moment of inertia, M the bending moment, ds the distance element along the bar and L the overall length of the bar, then the equation is:

$$A = \frac{1}{2 \cdot E \cdot I} \cdot \int_{s=o}^{L} M^2 \cdot ds$$

and, hence, $$f = \frac{\partial \cdot A}{\partial \cdot P}$$

According to an article by Von Joachim Palm in *VDI Zeitschrift*, Volume 101, No. 8, March 1959, pp. 301–308, the deflection f, which would have to be equated with the additional curvature ZK in our application, becomes $$f = \frac{1}{E \cdot I} \cdot \int_{s=o}^{L} M \cdot \frac{\partial M}{\partial P} \cdot ds$$

However, this only applies for small deflections. The mold core required to produce the sleeve tube in accordance with the invention on the plastic injection molding machine, can then be manufactured with a coordinate-controlled milling machine with the aid of the curve plotted by the iterative method.

The sleeve tube MF, when in a closed condition (FIG. 5) with the projections W in contact with each other and on a peripheral surface of an end sealing member DK of FIG. 1, will have a first radius R of curvature which is the same as the radius of curvature of the peripheral surface of the end sealing members DK. However, in the open molded position, as illustrated in FIGS. 4 and 6, the sleeve member has a changing radius of curvature, with the largest radius being a second radius at apex S or a point S opposite to the longitudinal opening and the second radius is larger than the first radius R. As best shown in FIG. 6, the radius of curvature decreases as the peripheral distance from point S increases. Thus, when the tube is moved to a closed position of FIG. 5, portions of the tube between the opening and the point S opposite the opening are slightly bent to a smaller curvature.

Although various minor modifications may be suggested by those versed in the art, it should be understood that we wish to embody within the scope of the patent granted hereon all such modifications as reasonably and properly come within the scope of our contribution to the art.

We claim:

1. In a sleeve tube having a longitudinally divided opening with longitudinal extending projection running along said opening, said sleeve tube being adapted to be sealingly closed on end sealing members by the longitudinal projections cooperating with closing elements to form a cable sleeve, the improvement comprising the sleeve tube being molded in a spread condition with an aperture angle between its longitudinal edges, said sleeve tube in said spread condition having a varying curvature different from a constant circular curvature of a fixed radius so that mating faces of the two longitudinal projections along the edges will come into face-to-face, uniform pressure contact when the sleeve tube is closed on said end sealing members.

2. In a sleeve tube according to claim 1, wherein the aperture angle, which is between the two longitudinal edges relative to a vertex of the sleeve tube opposite the opening, lies in a range of 60°–100° so that the sleeve tube can be easily removed from an injection molding form and fitted over a substrate to be sheathed without substantial deformation of the tube.

3. In a sleeve tube according to claim 2, wherein in the spread condition, the sleeve tube has a cross section starting adjacent the vertex approximates a first circle of a given radius and, as a peripheral distance from the vertex increases, the radius of curvature decreases from said given radius so that the ends are displaced inward from a position on said curve of the first circle 4. In a sleeve tube according to claim 3, wherein the radius of curvature of the sleeve tube in the spread condition is selected adjacent the projections so that a same sealing pressure prevails along the sealing areas on a periphery of each of the end sealing members when the sleeve tube is clamped thereon.

5. In a sleeve tube according to claim 3, wherein the radius of curvature adjacent the opening is selected so that the matching faces of the projections extend perpendicular to a tangent of the final curvature in the closed condition at the projections.

6. In a sleeve tube according to claim 2, wherein the sleeve tube in the spread condition has a cross sectional curvature from the vertex to the free longitudinal edges, which are determined by Castigliano's mathematical function to form the decrease in the radius of curvature adjacent the free ends.

7. In a sleeve tube according to claim 6, wherein the deflection creating the decrease in the radius of curvature is equal to a partial derivative of a deformation energy A with respect to a load P in accordance with $$f = \frac{\partial \cdot A}{\partial \cdot P}.$$

8. In a sleeve tube according to claim 1, wherein the sleeve tube is made of a thermoplastic material.

9. In a sleeve tube according to claim 8, wherein the thermoplastic material is a polyolefin.

10. In a sleeve tube according to claim 1, which includes peripheral seals between the sleeve tube and the end sealing members, said seals being made of an elastomer material.

11. In a sleeve tube according to claim 1, wherein each of the two projections have a wedge shape, said closing element being closing rails having a matching shape of the projections.

12. In a sleeve tube according to claim 11, wherein the closing rails are made of metal.

13. In a sleeve tube according to claim 11, wherein the closing rails are made of a fiber-reinforced thermoplastic material.

14. In a sleeve tube having a longitudinal opening extending the length of the tube, said tube adjacent said opening having projections extending along the opening for engagement by closing elements for holding the sleeve tube in a closed condition on peripheral surfaces of end sealing members, said peripheral surface being a curved surface having a first radius of curvature, the improvements comprising the sleeve tube being molded in an opened condition with a curvature having a changing radius of curvature, said curvature in the open condition at a point opposite the longitudinal opening having a second radius of curvature larger than the first radius of curvature for the closed tube, said radius of curvature decreasing as a peripheral distance from the opposite point increases towards the opening and approaches the first radius so that as the tube is moved into a closed position, portions of the tube between the opening and the point opposite the opening are slightly bent to a smaller radius of curvature.

15. In a sleeve tube according to claim 14, wherein an angle of opening in the molded tube extending from the point opposite the opening to the edges of the opening is an angle in the range of 60°–100°.

* * * * *